Aug. 1, 1944.   C. L. BARKLEY   2,354,734
ENGINE DRIVE FOR VEHICLES
Filed July 18, 1942
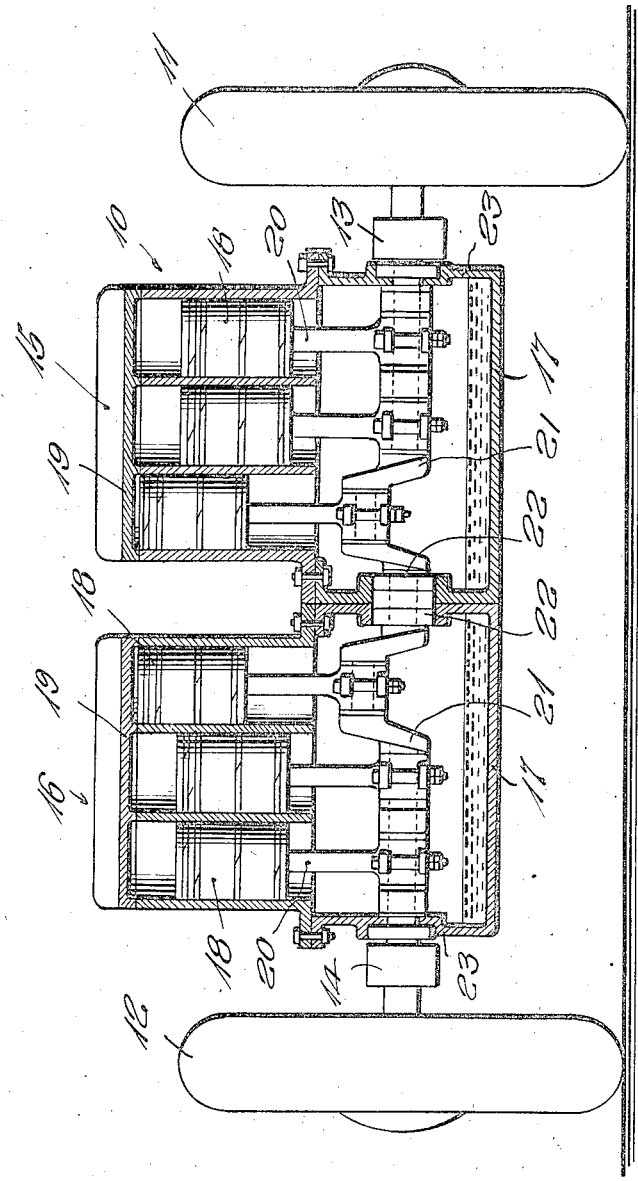
INVENTOR.
Charles L. Barkley
BY
Carl Miller
ATTORNEY Patented Aug. 1, 1944

2,354,734

UNITED STATES PATENT OFFICE 2,354,734

ENGINE DRIVE FOR VEHICLES

Charles L. Barkley, Pfafftown, N. C.

Application July 18, 1942, Serial No. 451,463

1 Claim. (Cl. 180—56)

The instant invention relates to a drive for a vehicle from a dual engine, preferably, of the variable cut-off constant pressure type, and contemplates that the crank shaft of the engine be directly connected to the wheels of the vehicle.

One of the objects of the invention is to provide a split or two-part crank shaft to replace the normal axle of the vehicle and in which there is a direct connection between the engine and the vehicle wheels.

Still a further aim is to construct a crank shaft formed in two parts, laterally aligned, each part being driven by an engine, preferably operable by compressed air or the like from a storage tank carried by the vehicle.

The above and other aims and objects will be apparent from the detailed description hereinafter appearing when taken in conjunction with the appended drawing in which the single figure is a view partly in section and partly in elevation of my engine drive.

Referring now to the drawing the reference numeral 10 designates a portion of a vehicle of any desired type, the numerals 11 and 12 identifying either the front or rear drive wheels thereof. Spaced longitudinally extending chassis members 13 and 14 constitute support for a dual motor 15 and 16, said motors being similar and each embodying a crank case 17, pistons 18, a removable cylinder head 19, connecting rods 20 and crank shaft 21. Each engine may be driven in any desired manner but preferably from a constant source of pressure contained in a gas storage tank (not shown) carried by the vehicle, the operation of the dual engine being synchronized by means not forming a part of the instant invention.

The crank shaft 21 for each of the motors 15 or 16 is journalled in a bearing 22, the opposite end of the crank shaft extending through the side wall 23 of the crank case 17 for connection to drive wheels 11 and 12.

It will now be seen that there is provided a two-part aligned crank shaft, each part driven by its own engine. Accordingly, in the event one of the drive wheels 11 or 12 should in any way be retarded, as for example, by being mired, the other drive wheel would be useful in extricating the vehicle.

While the invention has been described in specific detail, it will be understood that various changes may be made in the construction described above, and it is contemplated to cover all such, and to be limited in this respect only as may be necessary by the scope of the claim hereto appended.

What I claim and desire to secure by Letters Patent is:

In a wheeled vehicle, a chassis, a dual engine supported thereby, a crank case and a crank shaft for each engine, said crank case having a two-part central bearing, said shafts being aligned and supported by said crank case bearing, one end of each shaft projecting through a side wall of a crank case, and a wheel of the vehicle directly secured to the end of said projecting shaft, each engine having a removable head secured to said crank case and its two-part central bearing.

CHARLES L. BARKLEY.